Figure 1:
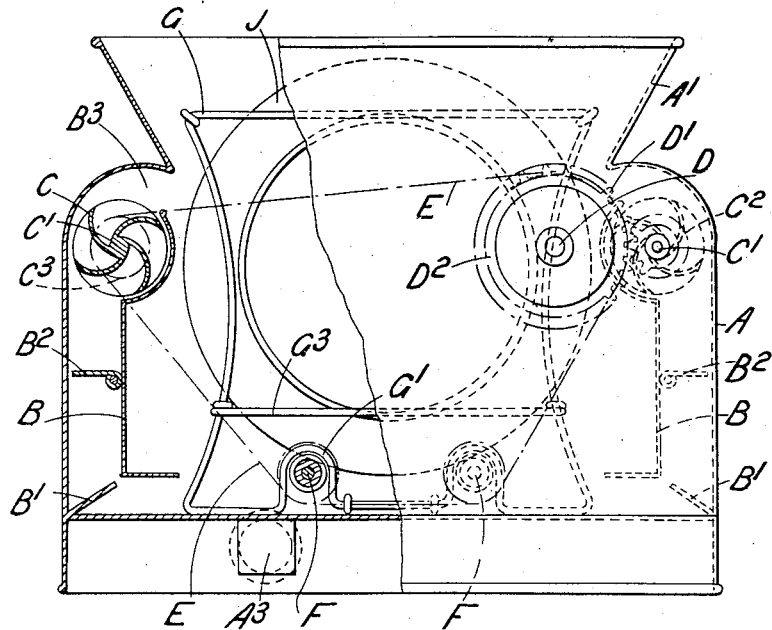

H. W. RODDA.
MACHINE FOR WASHING PLATES.
APPLICATION FILED JULY 28, 1913.

1,104,139.

Patented July 21, 1914.
2 SHEETS—SHEET 1.

WITNESSES.
L. H. Cadarr.
S. C. McBride.

INVENTOR.
Horace W. Rodda
by Foster Freeman Watson & Coit
Attys

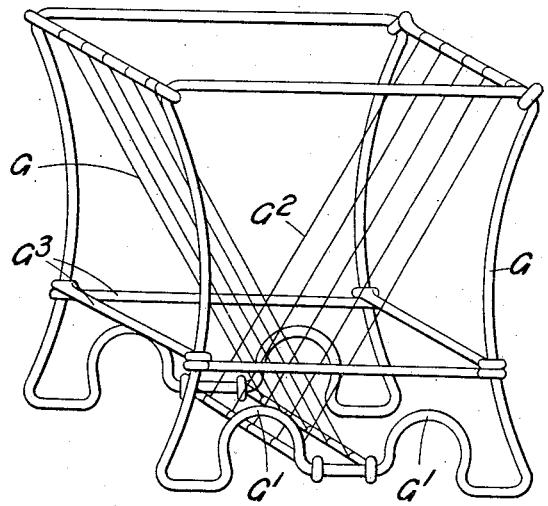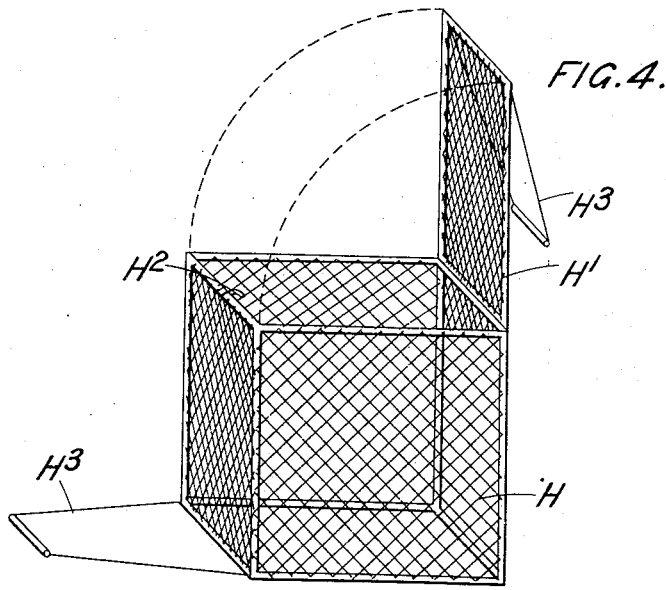

UNITED STATES PATENT OFFICE.

HORACE WYNDHAM RODDA, OF LONDON, ENGLAND.

MACHINE FOR WASHING PLATES.

1,104,139.  Specification of Letters Patent.  Patented July 21, 1914.

Application filed July 28, 1913. Serial No. 781,566.

*To all whom it may concern:*

Be it known that I, HORACE WYNDHAM RODDA, subject of the King of England, residing at London, in England, have invented certain new and useful Improvements in Machines for Washing Plates, of which the following is a specification.

This invention relates to machines for washing, rinsing and drying plates, dishes, cutlery and all other glass, silver or crockery articles, which are hereafter referred to as "tableware."

The object of this invention is to provide a machine in which the tableware can be rapidly washed with a small amount of water, without fear of breakages or the expenditure of much power.

According to this invention the machine comprises a tank adapted to hold a removable basket or rack containing the tableware, and provided with a rotary paddle adapted to circulate water through a lateral compartment of the tank and deliver it onto the articles within the basket. Preferably paddles are provided on opposite sides of the tank, so as to deliver the water from opposite directions upon the articles within the basket, the position of the paddles being such relatively to the water level, that though they circulate water within the tank, they do not have to act as pumps.

When the machine is used for washing up plates, saucers or other circular dishes, the rack or basket is of such construction that, when removed from the tank, it supports the plates in a vertical plane and serves as a draining rack. When the rack is introduced into the tank, its construction allows the plates within it to coöperate with mechanism within the tank which rotates the plates preferably in a vertical plane relatively to the rack, which remains stationary. The water-circulating members and the mechanism for rotating the plates are preferably operated from a common shaft, the operating gear being conveniently contained within a water-tight casing and adapted to be rotated by hand or by power.

The mechanism whereby the plates are rotated within their supporting rack preferably comprises grooved rollers with which the edges of the plates engage, in this way the plates being rotated in a vertical plane and also prevented from coming into contact one with another during their rotation and the passage between them of the water from opposite sides of the tank. Baffles or strainers may be provided within the lateral compartments to insure the proper course of the water from the base of the tank and to prevent grease or particles of food washed off the plates being carried into the upper part of the tank. The tank may be connected to some steam or hot water supply or may itself serve as a boiler in which the water is heated for washing the plates or other articles of tableware.

The position in the tank of the rollers or other plate-rotating members is such, that when other articles of tableware such as cups, jugs, cutlery or the like are to be washed these articles may be contained in a basket of suitable shape which can be introduced into the tank without being engaged by or interfering with the rollers. In such cases the articles themselves are not moved relatively to their containing basket but, as before, hot water is circulated through the basket and the articles it contains from opposite sides of the tank.

After being treated in the tank above described, the articles in their supporting rack or basket are preferably transferred to another tank where water may be circulated through them in the manner already described or where they may be merely rinsed before removal if necessary to another tank prior to their being allowed to dry still within their supporting rack or basket.

Although the paddles above described preferably only circulate the water within the tank, and do not act as pumps, thus economizing the power required to rotate them, yet in some cases, when mechanism is provided for rotating the plates, pumps may be provided to circulate the water between them if this is found desirable.

Figure 2:
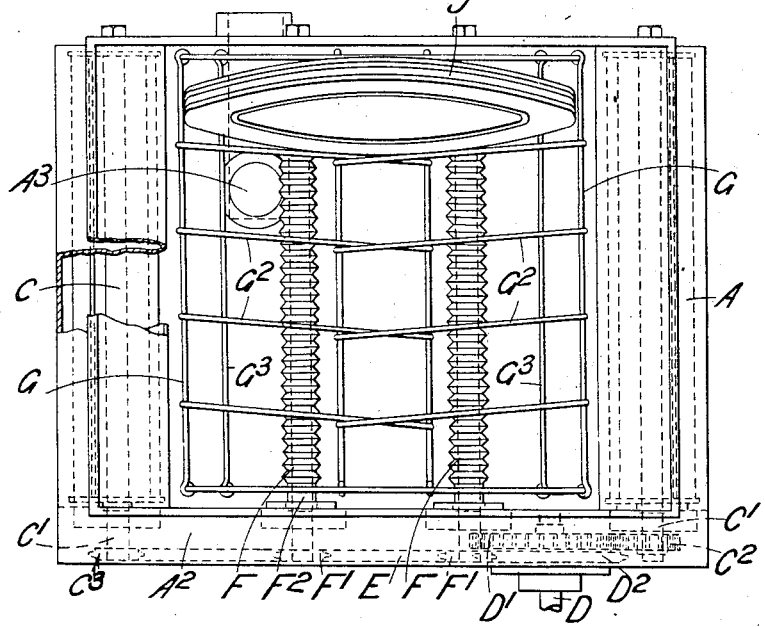

In the accompanying drawings which show one construction of machine according to this invention, Figure 1 is a side elevation showing the tank and supporting rack for plates, portions of the casing being broken away for the sake of clearness, Fig. 2 is a plan, as before a portion of the casing being broken away to show the operating mechanism, Fig. 3 is a perspective view of a preferred form of rack for plates or circular dishes, and Fig. 4 shows in perspective a basket or container for cups and other articles of tableware other than plates or circular dishes.

In the construction illustrated the machine comprises a tank A the end walls of which are curved inward near the top and provided with a funnel-shaped opening A'. Across the end walls of the tank are partitions B which extend to within a short distance of the base of the tank, the upper ends of these partitions being curved so as to form with the restricted portion of the outer casing substantially cylindrical chambers extending across the tank near the upper portion thereof. Mounted within the horizontal cylindrical chambers thus formed, are rotatable paddles or water-circulating members C, the shafts C' of which are journaled in the side walls of the tank in a water-tight manner through one of which walls they extend into an outer casing $A^2$ as shown in Fig. 2. Mounted within the casing $A^2$ is a driving shaft D the outer end of which carries a crank, operating handle or driving pulley and keyed to the shaft D within the casing is a toothed wheel D' and a sprocket wheel $D^2$. The toothed wheel D' engages a pinion $C^2$ keyed to the end of the right hand circulating paddle C, a chain E passing over the sprocket wheel $D^2$ and thus driving the other water-circulating paddle C, the shaft C' of which carries a sprocket wheel $C^3$ which, like the pinion $C^2$, is inclosed within the casing $A^2$.

Screens or strainers B' $B^2$ are preferably provided at suitable points within the lateral compartments formed by the partitions B, which prevent particles of food removed from the tableware passing upward with the water drawn by the circulators and delivered thereby into the upper portion of the tank, thus insuring the water, as it circulates, being directed against the tableware under treatment in a clean state.

Rotatably mounted within the tank near the base thereof are two grooved rollers F the spindles of which extend into the casing $A^2$ and have keyed to their outer ends sprocket wheels F' which are engaged by the chain E which rotates the left hand paddle C when the driving shaft is rotated. It will thus be seen that the paddles are rotated in opposite directions but the rollers F in the same direction when the shaft D is rotated.

When plates or other circular dishes are to be washed in the machine, a rack or basket G (Fig. 3) is employed, this rack being formed of stout wire or other suitable material. In the preferred form the lower members of the frame are curved upward at G' and inclined guide members $G^2$ are provided between which the plates are placed before the frame is introduced into the machine. At this stage the ties $G^3$ near the base of the rack support the edges of the plates. When the rack, with the plates, is introduced through the funnel-shaped opening A' of the tank, the inclined walls of which serve as a guide for the introduction of the rack, the edges of the plates engage the grooves in the rollers F and in this way are raised relatively to the frame F, the curved portions G' of the frame clearing the ends of the rollers which may be reduced as at $F^2$ for this purpose. The frame is supported within the tank in any suitable manner if desired so as to clear the base and end walls thereof. When articles other than plates or circular dishes are to be cleaned, a basket or container H similar to that shown in Fig. 4 is employed. This container is preferably provided with a hinged lid or wall H' which can be provided with any suitable form or fastening $H^2$, and preferably has folding handles such as $H^3$, whereby the basket can be introduced into the tank without the operator's hands having to enter the water, and which further enable the basket and its contents to be suspended for drying purposes after treatment in the tank.

The tank is provided with an outlet, shown diagrammatically at $A^3$, and may have suitable inlets for hot water or steam according to the dimensions of the tank and the conditions under which it is used.

In operation, when used for washing plates, the tank is filled with water to about the level of the paddle spindles C'. The plates, after being arranged in the frame G, are then introduced with the latter, and the driving shaft D is rotated, whereupon the paddles C rotate toward the center of the tank and the rollers F are simultaneously rotated. The edges of the plates J, which are now clear of the cross ties $G^3$, are thus rotated within the frame G, which remains stationary within the tank. The paddles C cause the water from the base of the tank to circulate through the lateral compartments formed by the partitions B and to be discharged through the openings $B^3$ which exist between the upper edge of the partitions B and the restricted portion of the outer casing of the tank A. In this way the water from the base of the tank, after passing through the screen B' $B^2$ is delivered in a clean state from opposite sides of the tank on to the articles within the rack which are simultaneously rotated. When articles other than circular dishes or plates are to be washed, they are placed in the basket H (shown in Fig. 4) which is then introduced into the tank, the dimensions of the basket being such that the rollers F are not interfered with. In all cases after treatment in the tank above described the articles in their containing rack or basket are subjected to further similar treatment in a second tank and are preferably finally rinsed in a third tank in which the water may be stationary or circulated as desired.

The temperature of the water within the tank or tanks may be maintained by means of burners below the tanks or by the introduction of steam or by heating coils within or along the walls of the tanks.

It will be appreciated that the constructional features of the apparatus above described may be considerably varied without departing from this invention.

What I claim as my invention and desire to secure by Letters Patent is:—

1. In a machine for washing plates and other circular articles of tableware, the combination of a tank, a stationary support for the plates within the tank, means for rotating the plates relatively to the stationary support and means for circulating water between the plates.

2. In a machine for washing plates and other circular articles of tableware, the combination of a tank, a removable rack adapted to support the plates, means for rotating the plates relatively to the rack and means for simultaneously circulating water between the plates.

3. In a machine for washing plates and other circular articles of tableware the combination of a tank, a removable rack adapted to support the plates, means within the tank for rotating the plates in their own plane relatively to the rack which remains stationary and means for simultaneously circulating water between the plates.

4. In a machine for washing plates and other circular articles of tableware the combination of a tank, a removable rack adapted to support the plates, rotary members within the tank adapted to engage the edges of the plates and rotate them in a vertical plane relatively to their stationary supporting rack and means for circulating water between the plates.

5. In a machine for washing plates and other circular articles of tableware the combination of a tank, a removable rack adapted to support the plates, rotatable grooved rollers within the tank adapted to engage the edges of the plates and rotate them in a vertical plane relatively to their stationary supporting rack, means for rotating said rollers and means for simultaneously circulating water between the plates.

6. In a machine for washing plates and other circular articles of tableware, the combination of a tank, a removable plate support within the tank, a water circulating member within the tank, and means for simultaneously rotating the plates on their support and actuating the water circulating member.

7. In a machine for washing plates and other circular articles of tableware, the combination of a tank, a removable plate support within the tank, water circulating members adapted to deliver water on to the plates from opposite directions, and means for simultaneously rotating the plates on their support and actuating the water circulating members.

8. In a machine for washing plates and other circular articles of tableware the combination of a tank, a removable rack adapted to support the plates, grooved rollers within the tank adapted to engage the plates and rotate them in a vertical plane relatively to their supporting rack, rotary water-circulating members on opposite sides of the tank, means for rotating the rollers and means connected therewith for simultaneously rotating the water-circulating members in opposite directions.

9. In a machine for washing plates and other circular articles of tableware, the combination of a tank, a removable rack adapted to support the plates, lateral compartments on opposite sides of the tank each forming a conduit leading from the lower to the upper part of the tank, grooved rollers within the tank adapted to engage the edges of the plates and rotate them in a vertical plane relatively to their supporting rack, rotary water-circulating members adapted to circulate water through the lateral compartments of the tank and deliver it on to the plates in opposite directions and means operated from a common shaft for rotating the rollers and water-circulating members.

10. In a machine for washing plates and other circular articles of tableware the combination of a tank, means within the tank for rotating the plates in a vertical plane, a removable rack coöperating with said means to permit the plates being rotated relatively to the rack and bars on the rack adapted to support the edges of the plates when the rack is removed from the tank.

In testimony whereof I have signed my name to this specification in the presence of two subscribing witnesses.

HORACE WYNDHAM RODDA.

Witnesses:
 MAURICE STRODE,
 FRANK GODWIN.

---

Copies of this patent may be obtained for five cents each, by addressing the "Commissioner of Patents, Washington, D. C."